(12) United States Patent
Parsons et al.

(10) Patent No.: US 7,259,901 B2
(45) Date of Patent: Aug. 21, 2007

(54) OPTICAL SIGNAL DEMODULATORS

(75) Inventors: Nicholas John Parsons, Colchester (GB); Michael John Duffield, Great Bentley (GB); Gareth Peter Lees, Southampton (GB)

(73) Assignee: Bookham Technology, plc, Towcester (GB)

( * ) Notice: Subject to any disclaimer, the term of this patent is extended or adjusted under 35 U.S.C. 154(b) by 35 days.

(21) Appl. No.: 10/502,487

(22) PCT Filed: Jan. 23, 2003

(86) PCT No.: PCT/GB03/00295

§ 371 (c)(1),
(2), (4) Date: Sep. 16, 2005

(87) PCT Pub. No.: WO03/063515

PCT Pub. Date: Jul. 31, 2003

(65) Prior Publication Data

US 2006/0056845 A1    Mar. 16, 2006

(30) Foreign Application Priority Data

Jan. 23, 2002    (GB) ................................ 0201463.7

(51) Int. Cl.
*G02B 26/00*  (2006.01)
(52) U.S. Cl. .................. 359/237; 359/325; 375/324
(58) Field of Classification Search ............. 359/237, 359/325; 398/188; 375/324, 350; 385/1–10
See application file for complete search history.

(56) References Cited

U.S. PATENT DOCUMENTS 5,355,243 A    10/1994   King
5,907,421 A    5/1999    Warren et al.
6,771,682 B2*  8/2004    Peters ...................... 372/50.1
2004/0081470 A1*  4/2004   Griffin ....................... 398/188

FOREIGN PATENT DOCUMENTS

| EP | 0 337 796 B1 | 7/1994 |
| EP | 0 595 140 B1 | 1/1998 |
| EP | 0 967 743 A2 | 12/1999 |

OTHER PUBLICATIONS

Paul T. J. et al: "3GBIT/S Optically Preamplified Direct Detection DPSK Receiver with 116Photon/Bit Sensitivity", Electronics Letters, IEE Stevenage, GB, vol. 29, No. 7, Apr. 1, 1993, pp. 614-615, XP000360842 ISSN: 0013-5194.

* cited by examiner

*Primary Examiner*—Timothy Thompson
(74) *Attorney, Agent, or Firm*—Lahive & Cockfield, LLP; Anthony A. Laurentano, Esq.

(57) ABSTRACT

An optical signal demodulator for demodulating an M-ary phase shift key (PSK) optical signal comprises a plurality of interferometers arranged such that the optical signal is divided between the interferometers. Each interferometer comprises a plurality of interferometer arms, each arm for transmitting a portion of the signal between an input and an output of the interferometer, the interferometer including an optical delay in one arm relative to another arm thereof. The optical delay between arms of an interferometer may be provided by an optical path length difference between the arms. The optical delay between arms of an interferometer may be different for one interferometer to that of another interferometer.

16 Claims, 3 Drawing Sheets

OPTICAL SIGNAL DEMODULATORS

RELATED APPLICATIONS

This application is a 35 U.S.C. 371 national stage filing of International Application No. PCT/GB03/00295, filed 23 Jan. 2003, which claims priority to Great Britain Patent Application No. 0201463.7 filed on 23 Jan. 2002, in Great Britain. The contents of the aforementioned applications are hereby incorporated by reference.

This invention relates to optical signal demodulators and in particular to M-ary differential phase shift key (DPSK) demodulators.

The present invention is described using differential quadrature phase shift key (DQPSK) techniques but is not limited to DQPSK. For this specification M-ary means PSK techniques where $M \geq 3$ (that is, any number of PSK signals excluding binary PSK).

Phase shift key (PSK) techniques for modulating optical signals are well known. Several signals can be modulated and transmitted in a single carrier signal. PSK signals can be decoded electronically but there are obvious advantages to decoding the signal in the optical domain.

A receiver requires an optical demodulator to recover the optical signals from the modulated DQPSK signal. Such demodulators are known in the art and presently comprise fibre optic interferometers. It is usual to introduce an optical delay of one signal symbol between each signal propagating on each arm of the interferometer. Typically, a phase shift of $\pi/2$ is also introduced between the two signals propagating on each arm of the interferometer. The optical output from the interferometer can be converted to an electrical signal by a photo-detector. Further, electrical processing may be required to recover each signal from the modulated signal.

There are various known methods for introducing the phase shift including extending one interferometer arm a relatively small distance with respect to the other arm. The signal on one interferometer arm takes a fraction of time $\Delta T$ longer to reach the interferometer coupler than the other signal transmitted over the slightly shorter arm. $\Delta T$ depends on the refractive index of the waveguide and the relative length difference between each arm, amongst other factors.

Typically, optical telecommunication systems transmit signals with a wavelength $\lambda$ of approximately 1550 nm. A relative difference in optical paths of $\lambda/4$ is required to achieve a $\pi/2$ phase shift between two signals transmitted over the interferometer arms. So, for a typical telecommunications system, $\lambda/4$ is approximately 375 nm. Assuming the refractive index n of the transmission medium is approximately 1.5, the physical length difference, $\delta D$, between each interferometer arm is given by $\delta D=\lambda/4n$, $\delta D=250$ nm for this example.

Accurate grinding and polishing of the interferometer fibre optic end faces is presently one method to achieve this value for $\delta D$. Furthermore, the tolerances required for $\delta D$ are extremely high and in the order of $\pm \delta D/20$. It is therefore very difficult to mass produce such optical demodulators with such an extremely high degree of accuracy and small margins of tolerance. The manufacturing process is lengthy and expensive. Furthermore, product quality control would also be very lengthy and costly, and the demodulators would have prohibitively expensive to produce on a large scale. Each demodulator would have to be thoroughly tested before it is commissioned.

There are other methods for achieving the $\delta D$ value which include mechanical stretching of the fibre to change its optical length. Also, UV bleaching of the fibre can also be used to modify its refractive index.

Further losses caused by stress induced birefringence in the fibre optic interferometer can add to the problems of using fibre based demodulators. These, losses occur if the fibres of each arm are wound or bent with different radii of curvature. The induced birefringence can cause unacceptably high polarisation dependent losses (PDL) to the signal.

EP 1113695 (Nortel Networks Limited-RTM) discloses an optical packet switching apparatus which utilises an interferometric fibre optic demodulator. Also, U.S. Pat. No. 6,271,950 (Lucent Technologies Inc.-RTM) discloses an optical transmission system for a differential M-plex PSK signal.

The system receiver also uses a fibre optic interferometer to demodulate the signal. The interferometer comprises an optical delay incorporated in one arm of the interferometer.

The inventors of the present invention have appreciated the need for an optical demodulator that can be mass-produced at relatively inexpensive costs and without the problems associated with the prior art.

A first aspect of the invention provides an optical signal demodulator for demodulating an M-ary phase shift key (PSK) optical signal, comprising:

a plurality of interferometers arranged such that the optical signal is divided between the interferometers;

each interferometer comprising a plurality of interferometer arms, each arm for transmitting a portion of the signal between an input and an output of the interferometer, the interferometer including an optical delay in one arm relative to another arm thereof.

The optical delay between arms of an interferometer of the demodulator may, for example, be provided by an optical path length difference between the arms.

Preferably the optical delay between arms of an interferometer of the demodulator is different for one interferometer to that of another interferometer of the demodulator. The optical delay of each interferometer preferably is approximately (or substantially) an integral number of signal symbols. Advantageously, the optical delay of each interferometer may be approximately (or substantially) one signal symbol.

The demodulator preferably includes at least one optical signal detector arranged such that the optical signal is divided between the interferometers and subsequently detected by the (or each) optical signal detector.

A second aspect of the invention provides an optical interferometer for processing an M-ary phase shift key (PSK) optical signal, the interferometer comprising: a plurality of interferometer arms, each arm for transmitting a portion of the modulated signal between an interferometer input and output; a coupler arranged on the output side of the interferometer for coupling each of the signal portions to one another; and a delay on one interferometer arm for delaying the signal portion of the signal propagated on that arm with respect to the second portion of the signal on a different arm.

The invention may comprise a planar waveguide demodulator or interferometer.

A further aspect of the invention provides a planar waveguide optical demodulator for demodulating an M-ary PSK signal, comprising an interferometer and a delay for delaying a first portion of the signal with respect to a second portion of the signal.

Some embodiments of the invention have the advantage that planar waveguides are readily mass produced on a single wafer substrate with an excellent degree of accuracy and device-to-device reproducibility. Fine control of the difference in optical length of each interferometer arm, and hence the phase shift between signals on each arm, can be achieved by local or universal heating of the waveguide or its substrate. Furthermore, the planar waveguide demodulators can be designed and manufactured so that any bends in the waveguide have substantially equal radii of curvature, thereby minimising the differences between each of the interferometer's arms.

Embodiments of the present invention are now described, by way of example, and with reference to the accompanying drawings, in which.

Figure 1:
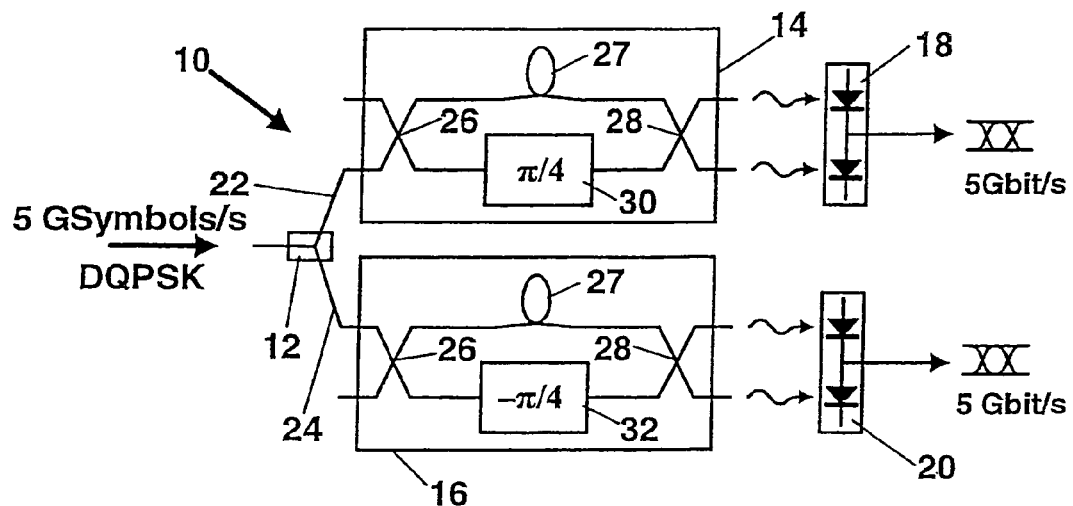
FIG. 1 is a schematic of the optical circuit embodying the present invention.

Referring to FIG. 1, an optical demodulator 10 embodying the invention is shown in circuit diagram form and comprises a splitter 12, two interferometers 14, 16 and electro-optic photo-detectors 18, 20. A 5 GSymbol/s differential quadrature phase shift key (DQPSK) modulated signal enters the demodulator and is split into two signals by the splitter. Each signal is transmitted along separate waveguides 22,24 to the respective interferometers 14 and 16. Each interferometer is in a Mach-Zehnder configuration and comprises a splitter 26 and a coupler 28. Other interferometer configurations, such as a Michelson arrangement, can be employed in the present invention. The configuration shown demodulates two signals from the modulated DQPSK signal. If more than two signals are modulated on the carrier signal then more interferometers may be needed.

An optical delay 27 on one arm of each interferometer introduces a delay to one signal of approximately a signal symbol. Each interferometer also comprises a phase shifter 30, 32 on an arm which introduces a phase shift of $+\pi/4$ and $-\pi/4$ respectively. The signals are recombined by the coupler 28 in each interferometer where they interfere with one another. The resulting signal is detected by the differential photo-detector 18, 20 respectively. In the embodiment shown the recovered signals are two 5 Gbit/s non-return to zero (NRZ) signals.

All the optical components can be constructed of planar waveguides on a single wafer. Electro-optic devices can also be manufactured or installed on the substrate so that all the demodulator components reside on a single optical chip.

Figure 2:
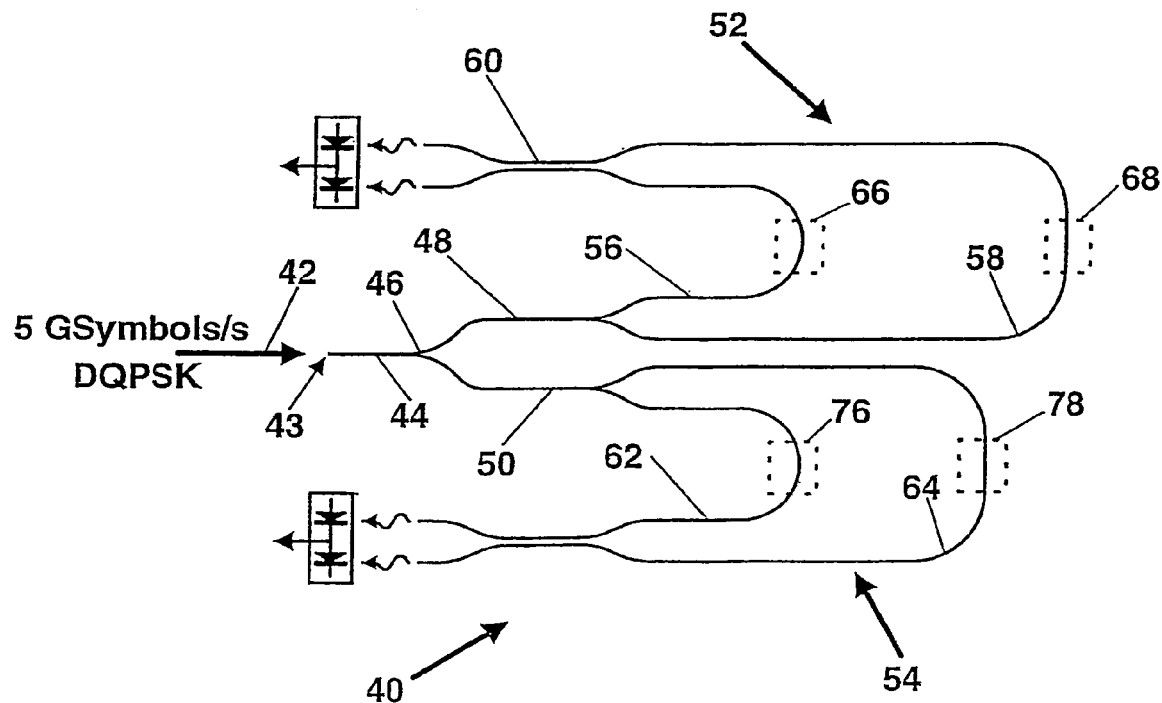
FIG. 2 is a diagram of a planar waveguide circuit embodying the present invention.

Referring to FIG. 2, a first realisation 40 of the present invention is shown. A modulated signal 42 enters the demodulator at its input. The input interface of the demodulator is a fibre optic (not shown) connected to the end facet 43 of the planar waveguide 44. A suitable coupling device (not shown) may also be used to attach the fibre to the waveguide.

The signal is split by a 3dB "Y" configuration splitter 46 and each split component of the signal propagates along a waveguides 48 or 50. Each waveguide extending from the splitter bifurcates to form two interferometers 52, 54 respectively. At the point of bifurcation the signal is split into two components of substantially equal intensity. The first arm 56 is shorter than the second arm 58 in the first interferometer 52. Thus, a portion of the signal that propagates along the first arm 56 reaches a coupler 60 before the same portion of the signal that has propagated along the longer second arm 58; an optical delay is thereby introduced between the signals on the interferometer arms. This optical delay is approximately equal to a signal symbol.

This interferometer arrangement is termed an unbalanced Mach-Zehnder interferometer (UMZI). The UMZI comprises two "U" bends in the waveguide, which geometric arrangement can be referred to as a trombone configuration. It is important that the radii of curvature of any bends in the UMZI arms are equal. This is essential to minimise any differences between each arm that may be caused by birefringence, for example. Also, polarisation dispersion may arise in the waveguide bends for the TE and TM propagation modes. This depolarisation effect can be compensated for by ensuring the bends of the waveguide demodulator are substantially equal. Thus, there is minimal difference in depolarisation effect between each of the interferometer's arms. An alternative method of minimising losses associated with birefringence or POL is to include a polarisation rotator 66, 68 approximately halfway along each arm of the UMZI. Each rotator is so arranged to transform TE components of the signal into TM, and vice versa.

The other part of the signal that propagate along the second waveguide 50 from the splitter 46 is also split into two further parts where the waveguide bifurcates at the input of the second interferometer 54. This second interferometer is substantially a mirror image of the first interferometer 52 and is a UMZI in a trombone configuration with two arms 62, 64 of different optical length. However, the longer arm 64 of the second interferometer has a slightly shorter optical length compared to the longer arm 58 of the first interferometer 52. Also, the arms 62, 64 may include polarisation rotators 76, 78 to reduce PDL as previously described.

The signal symbol for a 5 Gbit signal has a nominal length of approximately 40 mm when propagating through the waveguide material. The optical delay provided by the difference in length of the arm of the first interferometer 52, is designed to be just longer than this nominal length and is approximately 42 mm in the first realisation. Conversely, the optical delay provided by the difference in length of the arm of the second interferometer 54 is designed to be just shorter than this nominal length and is approximately 38 mm. The difference in length of the respective interferometer arms either side of the signal symbol length (that is ±2 mm in this instance) is required for the tuning the phase shift. If the arms were of equal length then a phase shift of $\pm\pi/4$ between each arm of each interferometer could not be achieved using the technique described below.

As explained previously, a relative optical phase shift of $\pi/4$ approximates to an optical path difference of 0.25 μm at the wavelengths-used in telecommunication applications. Achieving this path difference with ±10% tolerance requires 25 nm manufacturing tolerance. It is not possible to mass produce planar waveguides accurately to that tolerance and a method and apparatus for adjusting and tuning the length of the interferometer arms with respect to one another is required. In the first realisation tuning is achieved by controlling the temperature of the whole device. This is achieved by heating or cooling the device using, for example, a thermo-electric heater deposited on the waveguide structure, or a peltier cooler.

Modifying the device temperature affects the optical path length of the waveguide by thermal expansion/contraction and by virtue of the thermo-optic effect. The thermo-optic effect is the change in refractive index as a function of temperature.

Preferably, the waveguides are manufactured from germano-silicate glass material in a known way. This material typically has a thermo-optic coefficient of 8 ppm/° C. Varying the device temperature by 8° C. changes the optical length difference of the interferometer arms by the equivalent of 3 μm in a 42 mm arm. This change in effective length corresponds to a phase change of approximately π/° C. Thus, to control the optical length difference of each interferometer arm to accurately achieve a π/4 relative phase shift of the signal transmitted over that arm requires very close temperature control and in the order of 1/20th ° C., or so.

In the first realisation a relative phase shift of 2π between the signals transmitted over an interferometer's arms can be achieved by varying the temperature of the device by approximately 20° C. Thus, if the device temperature is scanned through 20° C. range, there will be a nominal temperature where both an optical carrier phase shift of π/2 exists between each interferometer and a symbol phase shift of 2π exists between each arm of each interferometer, that is a delay of one signal symbol. At this nominal temperature the device is accurately tuned and the modulated signals can be recovered with minimum loss.

It is possible to increase or decrease the ±2 mm difference in length of the respective interferometer arms. The device can be scanned over a smaller temperature range to achieve the 2π phase shift by increasing the difference in respective lengths. However, this has the effect of decreasing the SNR (signal to noise ratio) of the demodulated signal. Conversely, by decreasing the respective lengths, the temperature range required to tune the device is increased.

The change of phase shift with respect to temperature is approximately inversely proportional to the difference in optical length of the long arms in each interferometer. Thus a system demodulating higher or lower symbol rate signals will require careful design of the length of each interferometer arm to ensure a reasonable temperature range is used to tune the phase shift.

Figure 3:
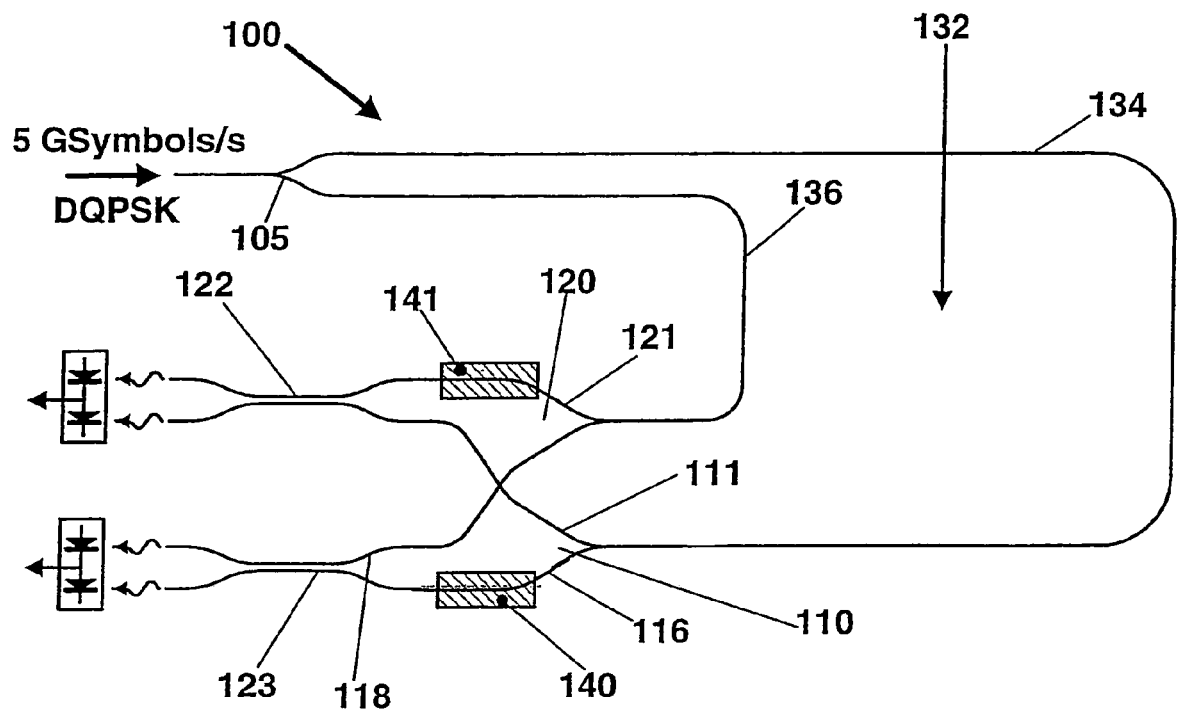
FIG. 3 is a diagram of another planar waveguide circuit-embodying, the present invention.

Referring to FIG. 3, a second realisation 100 of the present invention is shown. This configuration comprises a pair of interferometers formed by two main waveguides 134,136 extending from splitter 105 to couplers 122 and 123 respectively. This has the advantage of reducing the space, or real-estate required for the demodulator on the chip. This arrangement also allows for a single optical delay structure.

The 5 GSymbol/s signal is split into two parts by a 3 dB "Y" splitter 105 and propagates along the two waveguides 134,136. These two waveguides have different lengths and a generally "U" shape to form a single trombone configured optical delay 132. The delay between the two signals propagating along the waveguides is approximately a signal symbol. The radii of curvature of the bends in the trombone are equal to reduce signal losses, as discussed previously. Alternatively, polarisation rotators can be used.

Each waveguide bifurcates at bifurcation points 110 and 120 respectively. A first waveguide 111 extends from the first bifurcation point 110 to a first coupler 122, and a second waveguide 116 extends to a second coupler 123. From the second bifurcation point 120, a third waveguide 118 extends to the second coupler 123, and a fourth waveguide 121 extends to the first coupler 122.

Heater elements 140 and 141 are disposed on, or close to the second and fourth waveguides 116 and 121 respectively. The heaters are preferably disposed on straight sections of each waveguide and can be controlled independently. The independent control has the advantage of easing the tuning of the phase shift; only a temperature difference between each heater is required to provide the necessary phase shift of one signal relative to the other for demodulation of the encoded signal. This is in contrast to the first realisation described above, where a specific temperature of the device provided the conditions required for accurate demodulation. As an alternative to heaters, cooling devices such as Peltier coolers, can be used.

The length of each of the interferometer arms in the second realisation are not equal. Thus, tuning the optical length of the arms by thermal methods described previously can be used to introduce an optical phase shift of either + or −π/4 on each interferometer respectively. Each coupler output is incident on two separate differential photo-diodes respectively, similar to the first realisation.

The localised heaters are used to tune the lengths of each interferometer arm only; the optical signal delay structure 132, or any other part of the waveguide structure is not heated.

The second realisation has the advantage of having a single optical signal delay structure 132. This eases the manufacture tolerances of the device.

The thermal control can be achieved using a thin metallic film deposited on the substrate close to the waveguide layer. Passing a current through the metallic layer heats the waveguide by Joule heating. In the second realisation this metallic layer is restricted to the areas shown in FIG. 3; the whole device is not heated.

Figure 4:
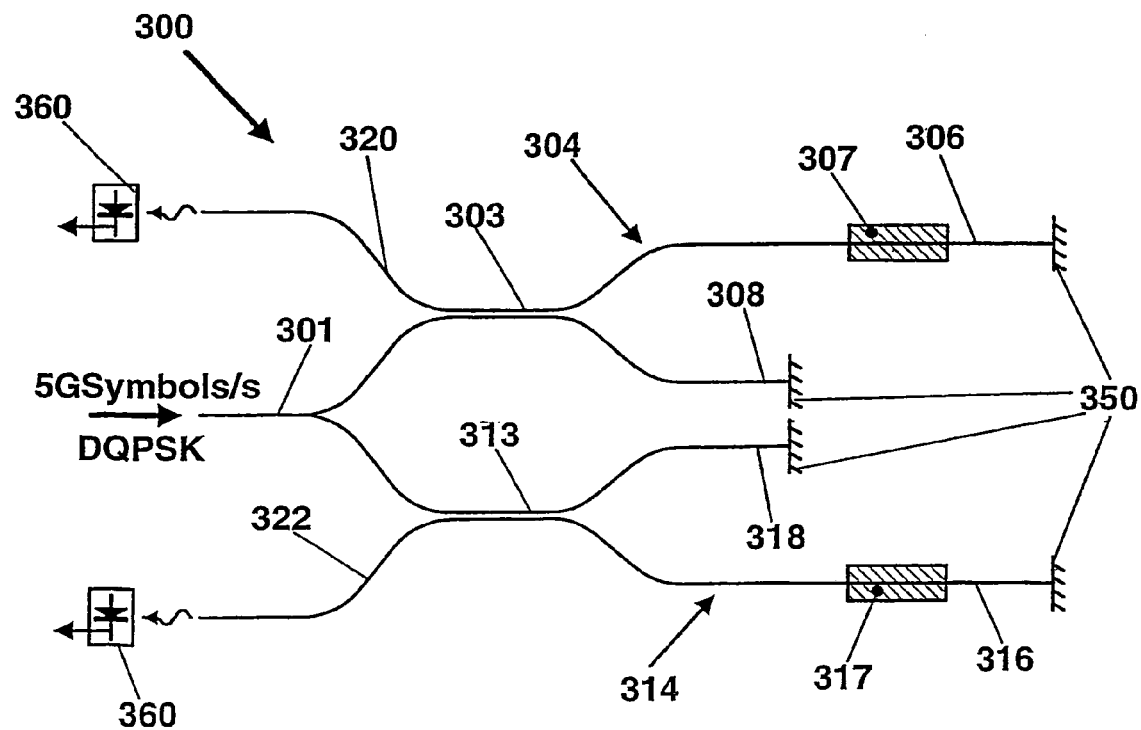
FIG. 4 is a diagram of a further planar waveguide circuit embodying the present invention.

Referring to FIG. 4, a third realisation 300 of the invention is shown. In this realisation the interferometers are arranged in a Michelson configuration. The signal propagates from the input, along the input waveguide 301, to a 3 dB "Y" splitter. One part of the split signal propagates on each waveguide to a coupler/splitter respectively 303,313. Each coupler/splitter is designed so that approximately half the signal is coupled onto the other waveguide at the coupler/splitter. From each coupler/splitter 303,313 each signal propagates along either arms 306, 308 or 316, 318 of a pair of interferometers 304, 314 respectively.

Each arm comprises a substantially straight waveguide between the coupler/splitter and mirrors 350. The mirrors can comprise a Bragg grating disposed in the waveguide material designed so that all the signal is reflected back along the waveguide. Bragg gratings are well known in the art and have been successfully constructed in planar waveguides. Alternative mirrors can include reflective surfaces disposed on an end facet of the waveguide material.

Each arm on each interferometer has a different length. Taking the first interferometer 304 as an example, the difference in optical length of arm 306 compared to arm 308 is approximately equal to half a signal symbol. Thus, the overall difference in optical path length (coupler-mirror-coupler) between the long and short arm is approximately one signal symbol. At each coupler the signal that has propagated along the interferometer arms are recombined and interfere with one another. The signal is coupled onto either an output waveguide 320, 322 respectively, or the input waveguide 301. Under certain circumstances half the signal may be coupled on to the output waveguide and half on to the input waveguide. Each interferometer output is detected by a single photodiode 360, it is not possible to use a balanced receiver in this realisation.

This realisation has the advantage that there are fewer bends in the waveguide, thus reducing any POL or birefringence effects. It may be necessary to use an optical isolator on the input waveguide 301 to isolate any equipment from unwanted return optical signals from the interferometers.

Heater elements 307 and 317 are preferably, disposed on the longer arm (306 and 316 respectively) of each interferometer. These heater elements are similar to those described for the second realisation shown in FIG. 3 and are independently controlled. The independent control is used to tune the relative phase shift in a similar way as previously described for the second realisation. This realisation can be constructed on a relatively small area of real-estate compared to the realisations discussed previously.

Figure 5:
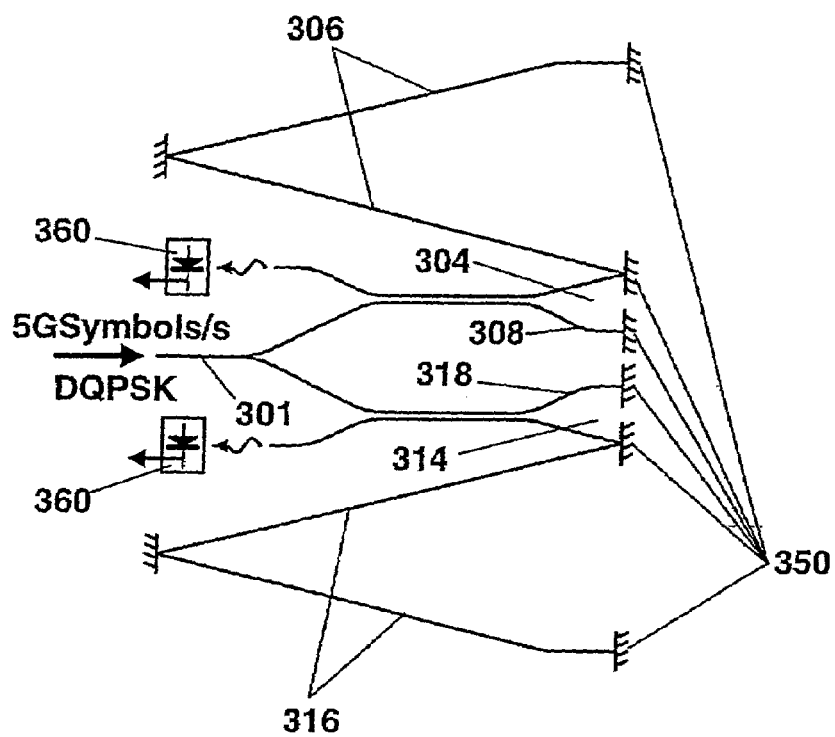
FIG. 5 is a diagram of an alternative planar waveguide circuit embodying the present invention.

Referring to FIG. 5, an alternative fourth realisation of the present invention is shown. (The heater elements, or other phase shift tuners, of the demodulator, are omitted for the sake of clarity.) This realisation also utilises a Michelson interferometer arrangement similar to the third realisation described earlier. However, the longer arm of each interferometer is in a folded arrangement thus providing a compact configuration. This arrangement has the advantage that all the mirrors 350 are located on a substantially common plane and the overall area of real-estate required to construct the device is further reduced. However, the mirrors require careful preparation so that the signal is reflected along the intended path. It may be advantageous to utilise a reflecting coupler device known in the art. In such a device a Bragg grating is disposed at a point in a 3 dB coupler so that all the signal from one waveguide incident on the grating is coupled onto another waveguide.

Figure 6:
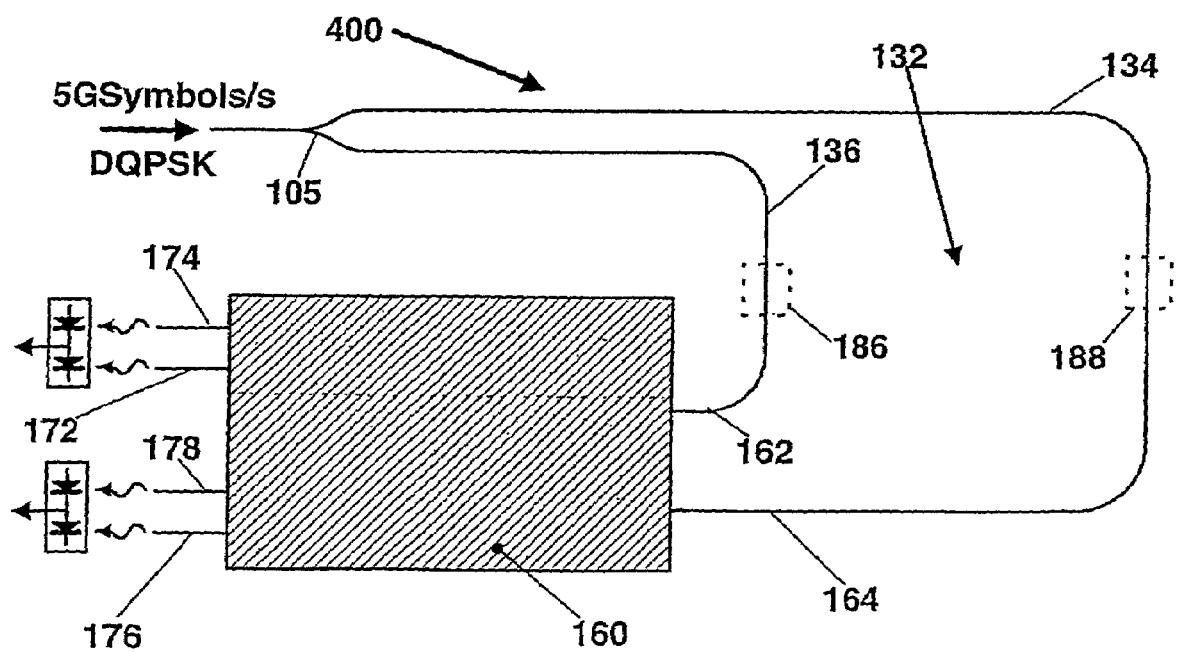
FIG. 6 is a diagram of a further alternative planar waveguide circuit embodying the present invention.

With reference to FIG. 6, a fifth realisation of the present invention is shown. This realisation is similar to the second realisation shown in FIG. 3 except that a multi-mode interference (MMI) coupler 160 is utilised to process the signal. MMIs are well known in the planar waveguide art and are used as couplers or splitters in many applications.

The MMI in this realisation has two input waveguides 162 and 164 respectively and four output waveguides 172, 174, 176, and 178 respectively. The input waveguides are located on an opposite side of the MMI to the output waveguides. The position, or location of the input waveguides relative to the output waveguides is critical to ensure an appropriate phase shift between the signals is achieved. Other factors, such as the length and width of the MMI are also critical to ensure accurate coupling of the signal from the MMI and thus accurate demodulation of the DQPSK signal in the optical domain. A large number of variations to the MMI design for this realisation are foreseen.

The two signals input to the MMI via waveguides 162 and 164 should be in phase to ensure the correct output is coupled from the MMI by each output waveguide. Thus, it is preferable to provide a tuner (not shown) on one of the arms (either 134 or 136) of the optical delay 132 respectively. The tuner is used to ensure each signal input to the MMI is in phase with one another.

The phase shift required for demodulation of the DQPSK signal is a function of the difference in optical path from, say input 162 to output 174 and input 164 to output 174. It is probable that the MMI device may need to be stabilised thermally to maintain the difference in optical path lengths. This can be achieved by stabilising the whole demodulator device.

The MMI has the advantage of easing the manufacture of planar waveguide demodulator devices; the MMI is preferably manufactured from the same material as the waveguide. Furthermore, no tuning of the MMI is required for this realisation.

Methods for manufacturing planar waveguides are well known. A waveguide cladding layer is first deposited on a silicon substrate. Onto this under-layer a patterned core layer is deposited to provide the waveguide routing. An over-cladding layer is deposited on top of the routing layer. The composition of the core layer is chosen to have a higher refractive index than both the under and over-cladding layers. The difference in refractive index between the core and cladding layers guides the signal in the core. Optical detectors, for example high speed avalanche or PIN photodiodes can be optically connected to the waveguide structure, as can optical fibres. Optical isolators may be required, either as a separate component, or embedded in the waveguide structure.

Other materials and substrates can be used in the manufacture of devices that embody the present invention. For example, GaAs, or other group III-V semiconductor devices, polymeric compounds, silicon or other silica glasses can be used with suitable cladding to manufacture the planar waveguide demodulators. Furthermore, active silicon optical components technology such as ASOC (RTM-Bookham Technologies) may be suitable for an apparatus embodying the present invention. Silicon based devices may be attractive for their semi-conductor properties which may be utilised to tune optical path lengths in interferometer arms, for example.

The invention claimed is:

1. A planar waveguide optical signal demodulator for demodulating an M-ary phase shift key (PSK) optical signal, comprising:
   a plurality of interferometers arranged such that the optical signal is divided between the interferometers;
   each interferometer comprising a plurality of interferometer arms, each arm for transmitting a portion of the signal between an input and an output of the interferometer, the interferometer including an optical delay in one arm relative to another arm thereof, and a coupler arranged on the output side of the interferometer for coupling each of the signal portions to one another;
   wherein the optical delay between arms of said interferometer is provided by an optical path length difference between the arms.

2. The demodulator according to claim 1, wherein the optical delay between arms of said interferometer is different for one of said plurality of interferometers than another of said plurality of interferometers.

3. The demodulator according to claim 1, wherein the optical delay of each interferometer is approximately an integral number of signal symbols.

4. The demodulator according to claim 3, wherein the optical delay of each interferometer is approximately one signal symbol.

5. The demodulator according to claim 1, further comprising at least one optical signal detector arranged such that the optical signal is divided between the plurality of interferometers and subsequently detected by the optical signal detector.

6. The demodulator according to claim 1, wherein the tuner comprises a thermal device for changing a temperature of a region of said interferometer arm.

7. The demodulator according to claim 6, wherein the thermal device comprises one of a heater and a cooler.

8. The demodulator according to claim 1, wherein at least one of the plurality of interferometers comprises a Mach-Zehnder interferometer.

9. The demodulator according to claim 1, further comprising a polarization rotator disposed on one of said plurality of interferometer arms for rotating the polarization of the signal on said arm.

10. The demodulator according to claim 1, wherein at least one of the plurality of interferometers comprises a Michelson interferometer.

11. The demodulator according to claim 1, wherein at least one of the plurality of interferometers comprises a multi-mode interference (MMI) coupler.

12. The demodulator according to claim 11, wherein the MMI coupler is arranged to introduce a phase shift between two or more signal portions propagating in the coupler.

13. A planar waveguide optical interferometer for processing an M-ary phase shift key (PSK) optical signal, the interferometer comprising: a plurality of interferometer arms, each arm for transmitting a portion of a modulated signal between at least one interferometer input and a plurality of interferometer outputs; a coupler arranged on the output side of the interferometer for coupling each of the signal portions to one another; a delay on one interferometer arm for delaying the signal portion of the signal propagated on that arm with respect to the second portion of the signal on a different arm, wherein a $\pi/2$ phase difference is provided between portions of the signal propagated by at least two said outputs; and a tuner for adjusting one or more interferometer parameters to modify a phase shift between the signal portions transmitted by each arm of the interferometer.

14. The optical interferometer according to claim 13, wherein the coupler is a multi-mode interference (MMI) coupler.

15. The optical interferometer according to claim 14, wherein the MMI coupler is so arranged to introduce a phase shift between two or more signal portions propagating in the coupler.

16. The optical interferometer according to claim 13, wherein a $\pi/2$ phase difference is provided between portions of the signal propagated by each output with respect to at least one other said output.

* * * * *